D. C. WATT AND F. A. GREARSON.
ANGLING DEVICE FOR AUTOMOBILES AND OTHER USES.
APPLICATION FILED JUNE 22, 1917. RENEWED JAN. 12, 1922.
1,407,713.
Patented Feb. 28, 1922.
2 SHEETS—SHEET 1.
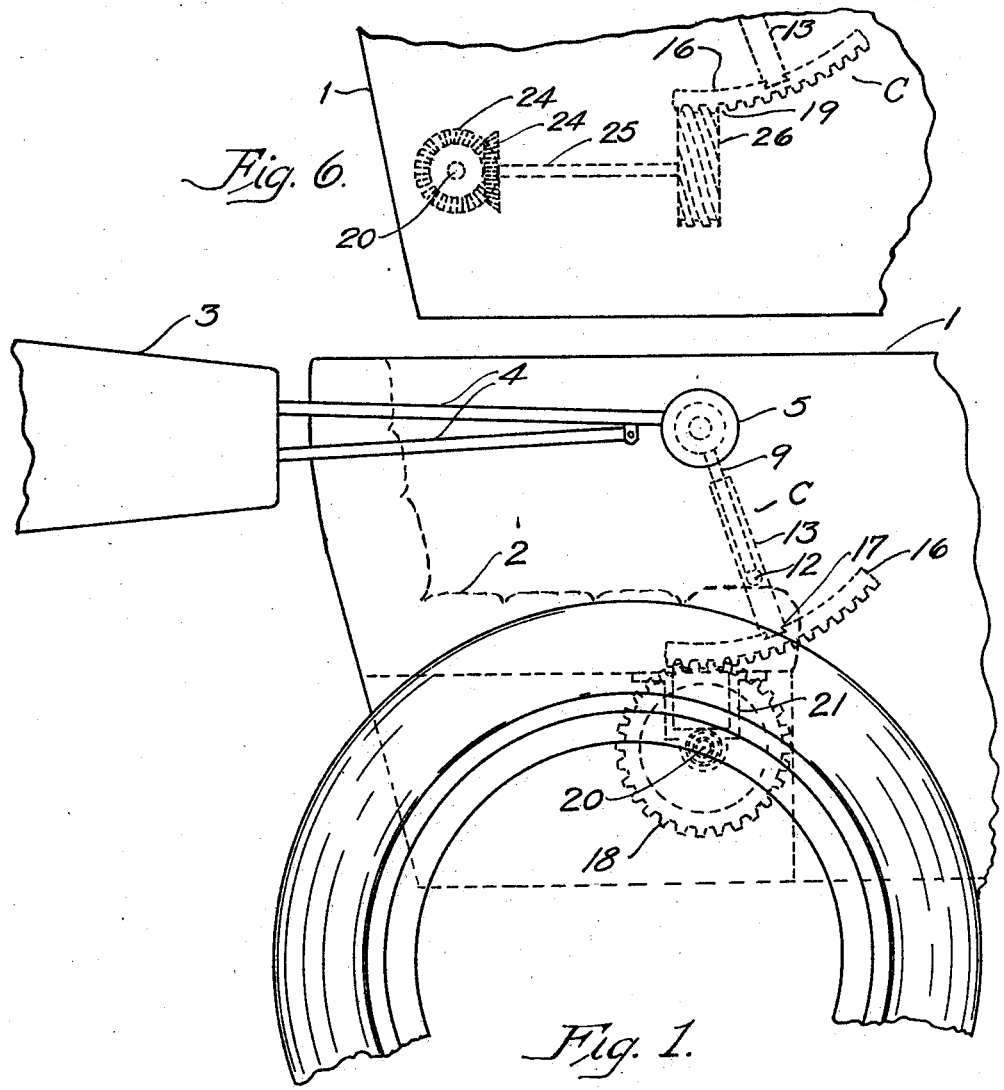
INVENTORS
D. C. Watt & F. A. Grearson
BY
ATTORNEY.

D. C. WATT AND F. A. GREARSON.
ANGLING DEVICE FOR AUTOMOBILES AND OTHER USES.
APPLICATION FILED JUNE 22, 1917. RENEWED JAN. 12, 1922.
1,407,713.
Patented Feb. 28, 1922.
2 SHEETS—SHEET 2.
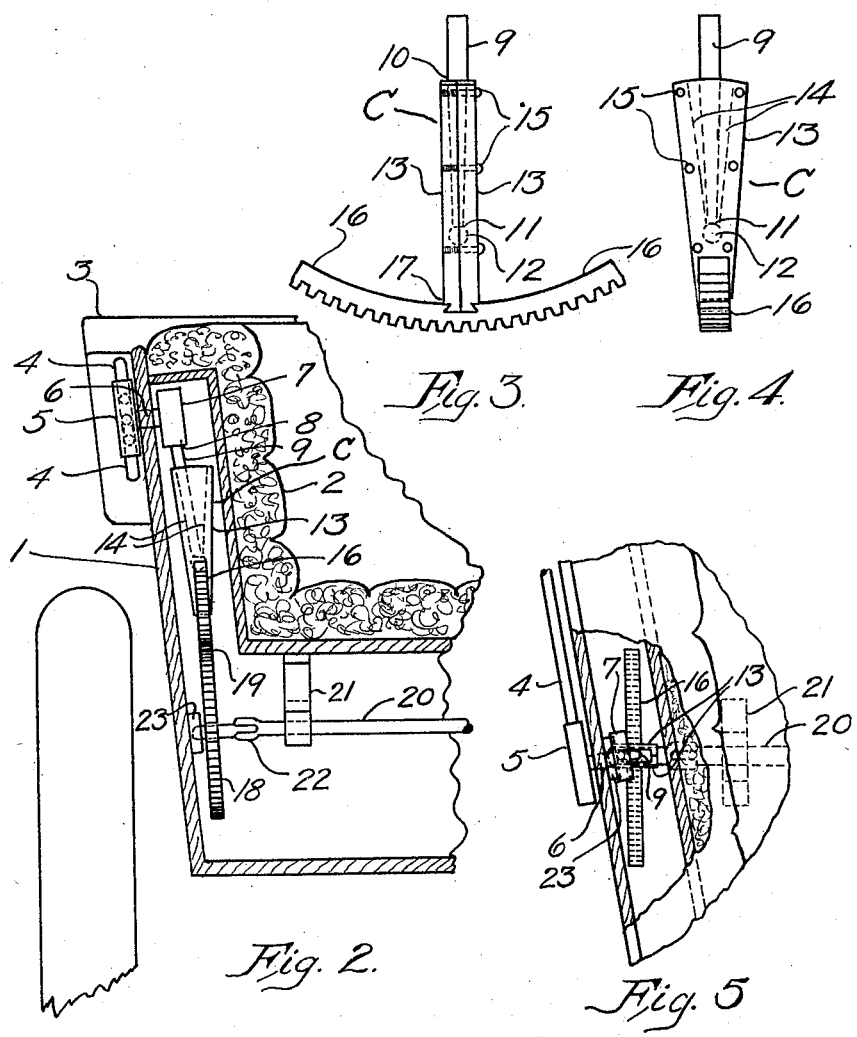
INVENTORS
D. C. Watt + F. A. Grearson
BY Grant Burroughs
ATTORNEY.

UNITED STATES PATENT OFFICE.

DELTON C. WATT, OF DANVILLE, AND FREDERICK A. GREARSON, OF BARRE, VERMONT.

ANGLING DEVICE FOR AUTOMOBILES AND OTHER USES.

1,407,713.      Specification of Letters Patent.      Patented Feb. 28, 1922.

Application filed June 22, 1917, Serial No. 176,321. Renewed January 12, 1922. Serial No. 528,818.

*To all whom it may concern:*

Be it known that we, DELTON C. WATT and FREDERICK A. GREARSON, citizens of the United States, and residents, respectively, of Danville, in the county of Caledonia and State of Vermont, and of Barre, in the county of Washington and State of Vermont, have invented certain new and useful Improvements in Angling Devices for Automobiles and other Uses, of which the following is a specification.

Our invention relates to an angling device for automobiles.

The main object of our invention is to cause the proper meshing of gears on two shafts which are not in line, and when power is to be transmitted from one shaft to another by two gears, said shafts not being in line, the angling device will take care of the offset angle caused by the shafts not being in line. The said angling device will adjust itself and properly cause the two gears to mesh.

This is especially adapted for automobiles where the power shaft is not parallel with the shaft that directly operates the top, that is, the power transmitting shaft and the shaft operating the top operating mechanism are not in line.

This angling device may be used between any two shafts that are not parallel on automobiles or similar conveyances and also for other purposes where the two shafts are not parallel.

Owing to the construction of the automobile body the sides are built at other than right angles to the bottom of the car. It is necessary to have this angling device to cause proper meshing of the gears on the shaft which is parallel with the bottom of the car and the shaft that is at right angles with the side of the body of the car, since these two shafts are not parallel, and this device takes proper care of this adverse condition and produces a proper meshing of the gears on the two non-parallel shafts.

In the accompanying drawings which illustrate a construction embodying our invention.

Fig. 1 is a side view of the car showing the angling device in position.

Fig. 2 is a section showing the angle of the body of the car and how the angling device takes care of said angle of the body.

Fig. 3 is an enlarged detail side view of the angling device.

Fig. 4 is an enlarged detail end view of the angling device.

Fig. 5 is a top view looking down on the angling device showing the side angle of the car body and how the angling device takes care of this angle.

Fig. 6 is a detail view of a modified form of a device for transferring the power from the power operated shaft to the power receiving shaft.

The body 1 of the car and the seat 2 are of ordinary construction. The automatic top 3 is secured to the hub 5 by the braces 4. The hub 5 is attached to the shaft 6 and the shaft 6 passes through the body 1 of the car and on the inside is fastened the hub 7. The rod 9 which is part of the angling device is fixedly attached to the hub 7 at point 8.

The angling device consists of the rod 9 which is shaped like a cylinder as far as point 10, then tapering like a cone as far as point 11 and then it is ball shaped on the end 12.

About the rod 9 are placed the two casings 13. The casings 13 are cut out to allow the rod 9 to turn and swing in the cut out slot 14. The two casings 13 are held together by the bottom head machine screws 15. The lower end of the casings 13 are secured to the center of a segmental gear 16 by means of a dove-tail joint 17.

The ratchet gear 16 meshes into the gear 18 at point 19. Gear 18 is attached fast to the shaft 20 which operates the auto top 3. The shaft 20 is attached to the base of the seat 2 by the bracket 21.

After the shaft 20 passes through the bracket 21 near the gear 18 a standard swivel joint 22 is placed to give the gear 18 a slight angle on the end of shaft 20. Attached to the body 1 is the thrust bearing 23 to allow the shaft 20 to turn properly.

By this invention we are able to obtain under adverse conditions a proper mesh of driving gears from the power shaft to the top.

The socket formed by the connected casings 13 permits the use of the device in connection with different automobile bodies wherein there is a variation in the angularity of the side of the body with respect to the driving shaft 20, the movement permitted to the rod 9 by the socket allowing the segmental gear to adjust itself to the gear 18 under varying conditions.

The ball on the end of the rod 9 during the meshing of the two gears allows the various angles to be assumed by the rod 9 to take up and provide for proper meshing of the gears.

By the construction of the angling device with the ball, socket and joint the rack gear is allowed to travel at any angle and go in perfect mesh with connecting gears.

Having thus described the nature of our invention and set forth a construction embodying the same, what we claim as new and desire to secure by Letters Patent of the United States, is:

The combination of a pair of non-parallel shafts, an arm fixed on one of said shafts, a socketed member receiving said arm and having pivotal movement with respect thereto, a gear fixed to the other shaft and a segmental gear fixed to the socketed member and meshing with the first named gear.

In testimony whereof, we have signed our names to this specification this 22nd day of March, A. D. 1917.

DELTON C. WATT.
FREDERICK A. GREARSON.